Nov. 7, 1933.   W. R. FISHER   1,934,415
TOOL RETAINER
Filed Feb. 5, 1930
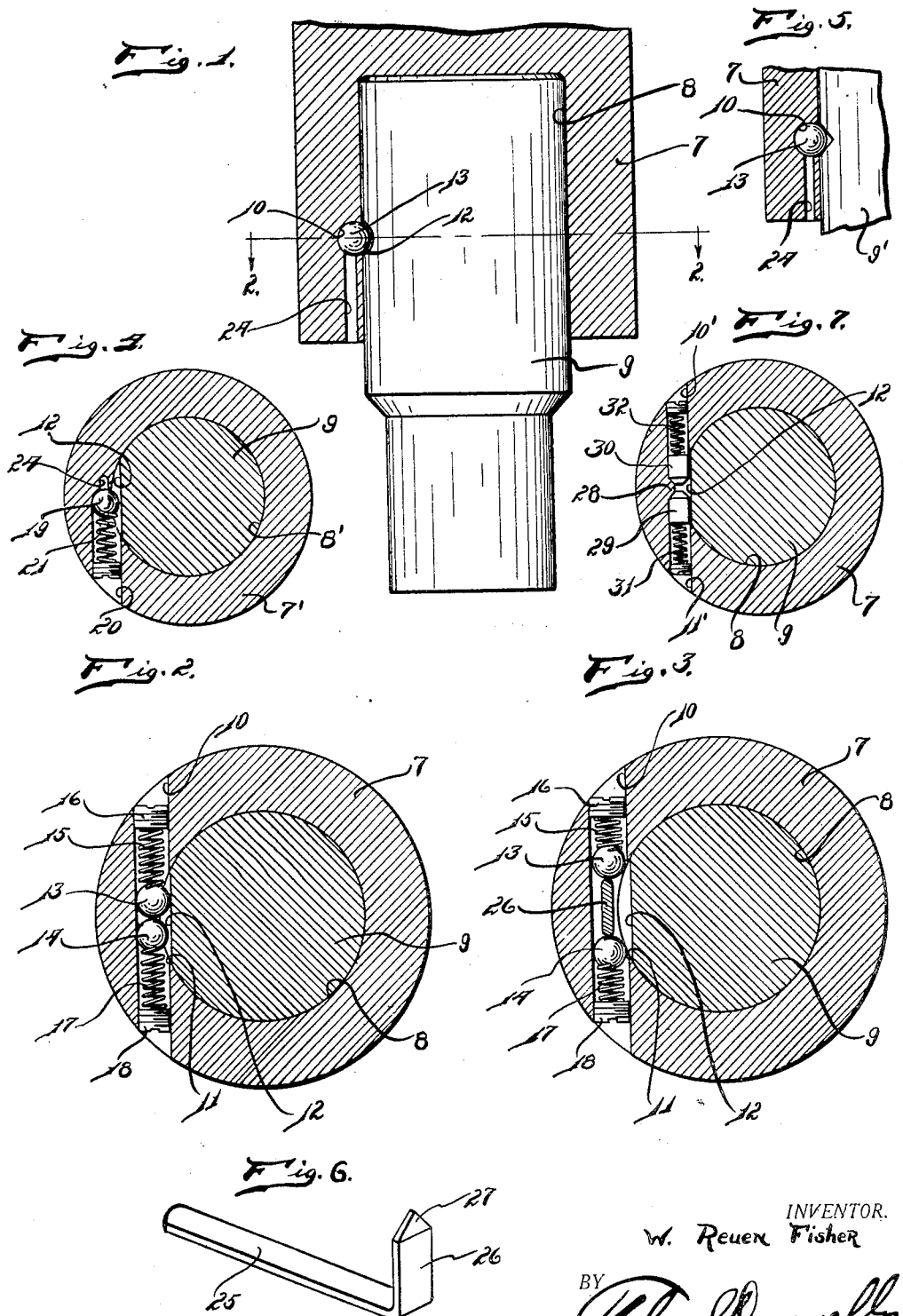
INVENTOR.
W. Reuen Fisher
BY Thos. S. Donnelly
ATTORNEY Patented Nov. 7, 1933

1,934,415

UNITED STATES PATENT OFFICE 1,934,415

TOOL RETAINER

W. Reuen Fisher, Frankenmuth, Mich.

Application February 5, 1930. Serial No. 425,990

1 Claim. (Cl. 279—79)

My invention relates to a new and useful improvement in a tool retainer and is particularly adapted for retaining punches, dies, drills, reamers, and similar tools in position on the retaining tool with which they are used. It is an object of the present invention to provide a tool retainer of this class whereby the tool may be securely held in position in the retainer and prevented from relative movement therein while at the same time the tool may be easily and quickly inserted in the retainer or removed therefrom.

Another object of the invention is the provision of a tool retainer of this class in which a maximum bearing surface of the retaining element on the tool may be provided.

Another object of the invention is the provision of a tool retainer of this class in which the retaining pressure or action of the retaining element on the tool will be directed at such an angle that the maximum resistance to movement of the tool in the retainer may be obtained and a durable structure provided.

Another object of the invention is the provision of a tool retainer of this class which will be simple in structure, economical of manufacture, easily and quickly assembled and disassembled and easy and quick in its operation for permitting the insertion and removal of the tool into and out of the retainer.

Other objects will appear hereinafter.

Fig. 1 is a central sectional view of the invention.

Fig. 2 is a view taken on line 2—2 of Fig. 1 showing the retaining elements in operative position.

Fig. 3 is a view similar to Fig. 2 showing the retaining elements in inoperative position.

Fig. 4 is a sectional view illustrating a modified form of the invention.

Fig. 5 is a fragmentary sectional view illustrating a V shaped retaining groove.

Fig. 6 is a perspective view of the releasing tool.

Fig. 7 is a sectional view illustrating a modified form.

In the invention I provide a tool retainer 7 having a socket 8 for the reception of the shank 9 of the tool, which, in the present instance is illustrated as a punch. Formed chordally in the retainer 7 is a passage 10 which opens into the bore or socket 8 as at 11. Formed in the periphery of the tool 9 and lying in a plane at right angles to the longitudinal axis of the tool 9 is a peripheral groove 12. In the form shown in Figs. 1, 2, and 3, this groove is indicated as being struck on a circle. The location of the groove 12 is such that, when the tool 9 is inserted into the socket or bore 8 of the retaining member 7 so that the end of the tool 9 would engage the end of the bore or socket 8 to prevent its further insertion into the retainer 7, the groove 12 will be in registration with the passage 10. Loosely positioned in the passage 11 in the form shown in Figs. 1, 2, and 3 are locking members or retaining elements 13 and 14 which are shown as spherical balls. A spring 15 engages at one end the ball 13, and at the other end a plug 16 which is secured in the passage 10. A spring 17 engages at one end the ball 14 and at the opposite end a plug or abutment member 18 which is secured in the passage 10. The construction is such that the balls, when engaging each other, will be positioned at the portion 11 at which the passage 10 communicates with the bore 8 so that when the tool 9 is inserted into the retainer 7 and the groove 12 brought into registration with the passage 10, the balls 13 and 14 will engage in the groove 12 and prevent the withdrawal of the tool 9 from the retainer 7. In Fig. 4 I have shown a single ball 19 mounted in the passage 20 and pressed by the spring 21 into operative position. It is believed evident that the balls 13 and 14 may be substituted with rollers or any other suitable locking member which will slide in the passage 10. In the form shown in Figs. 1, 2, and 3, I have shown the passage 10 formed cylindrical with the groove 12 formed semi-circular in cross-section, of substantially the same diameter as the balls 13 and 14. In the form shown in Fig. 5 I have illustrated a V shaped groove in the tool formed in the periphery of the tool 9'. The locking effect of the locking elements on the tool when placed in the bore or socket of the retainer is substantially the same whether a V shaped groove or a groove semi-circular in cross-section be used. The passage 10 is so formed relative to the bore or socket 8 that the locking members project well inwardly of the bore or socket when in operative position.

By having these locking members slidable in the passage 10 which is located in a plane transversely to the longitudinal axis and engageable in a chordally directed groove which extends at right angles to the axis of the tool 9 a maximum resistance is offered the tool 9 upon its attempted withdrawal from the retainer and a large part of the tool and retainer is engaged to prevent this withdrawal.

An axially directed passage 24 is formed in the open end of the retainer 7 and directed inwardly so as to communicate with the passage 10. A separable tool 25 having the angularly turned portion 26 and provided with the wedge shaped end 27 is provided for releasing the balls or locking elements 13 and 14 to permit the removal of the tool 9 from the retainer 7. By inserting this angularly turned end 26 into the passage 24 so that the point of the wedged portion 27 will engage between the balls, the tool is positioned for moving the balls to inoperative position. This is effected by thrusting the angularly turned end 26 further into the passage so as to force the balls or locking elements into separate relation as shown in Fig. 3 so that these locking elements are forced into the passage 10 at the portion which does not communicate with the bore or socket 8. Where a single locking member is used the retraction of the locking member is effected in the same manner.

In the form shown in Fig. 7 the tool 9 is provided with the chordally extended peripheral groove 12 and the retainer 7 is provided with passages 10' and 11' in alignment with each other and opening into the bore or socket in the retainer 7. Centrally of the passage, however, is formed an inwardly projecting boss 28 so as to limit the inward movement of the locking members 29 and 30 which are pressed inwardly by the springs 31 and 32 respectively. In this form the retraction of the locking members is effected as already described for the other forms.

While not necessary, I have found that a more efficient operation of the retainer is effected by having the slidable locking members engage the tool at a point at which the longitudinal axis of the peripheral groove in the tool is not at right angles to the radius of the tool. With this arrangement the deeper the groove is formed the more acute will be the angle and consequently the greater resistance is offered.

While I have illustrated and described the preferred form of construction I do not wish to limit myself to the precise details of structure shown but desire to avail myself of such variations and modifications as may come within the scope of the appended claim.

Having thus described my invention, what I claim as new and desire to secure by Letters Patent is:

A device of the class described, comprising: a tool having a transversely extended peripheral groove; a retainer having an opening for the reception of said tool, said retainer having a passage extended chordally of said opening and communicating, intermediate its ends, therewith, the groove in said tool upon insertion of said tool into said retainer, registering with said passage and communicating therewith; a pair of separate locking members slidably positioned in said passage and engageable in the groove in said tool for locking the same against removal from said retainer; a spring for pressing each of said locking members inwardly of each other into engaging position, said retainer having an axially directed passage communicating with said chordally extended passage for accommodating a spreading tool inserted therein for spreading said locking members into non-operative position.

W. REUEN FISHER.